C. B. FOLEY.
PROCESS OF TREATING METALS AND ALLOYS.
APPLICATION FILED JUNE 29, 1917. RENEWED JAN. 19, 1920.
1,350,714.   Patented Aug. 24, 1920.
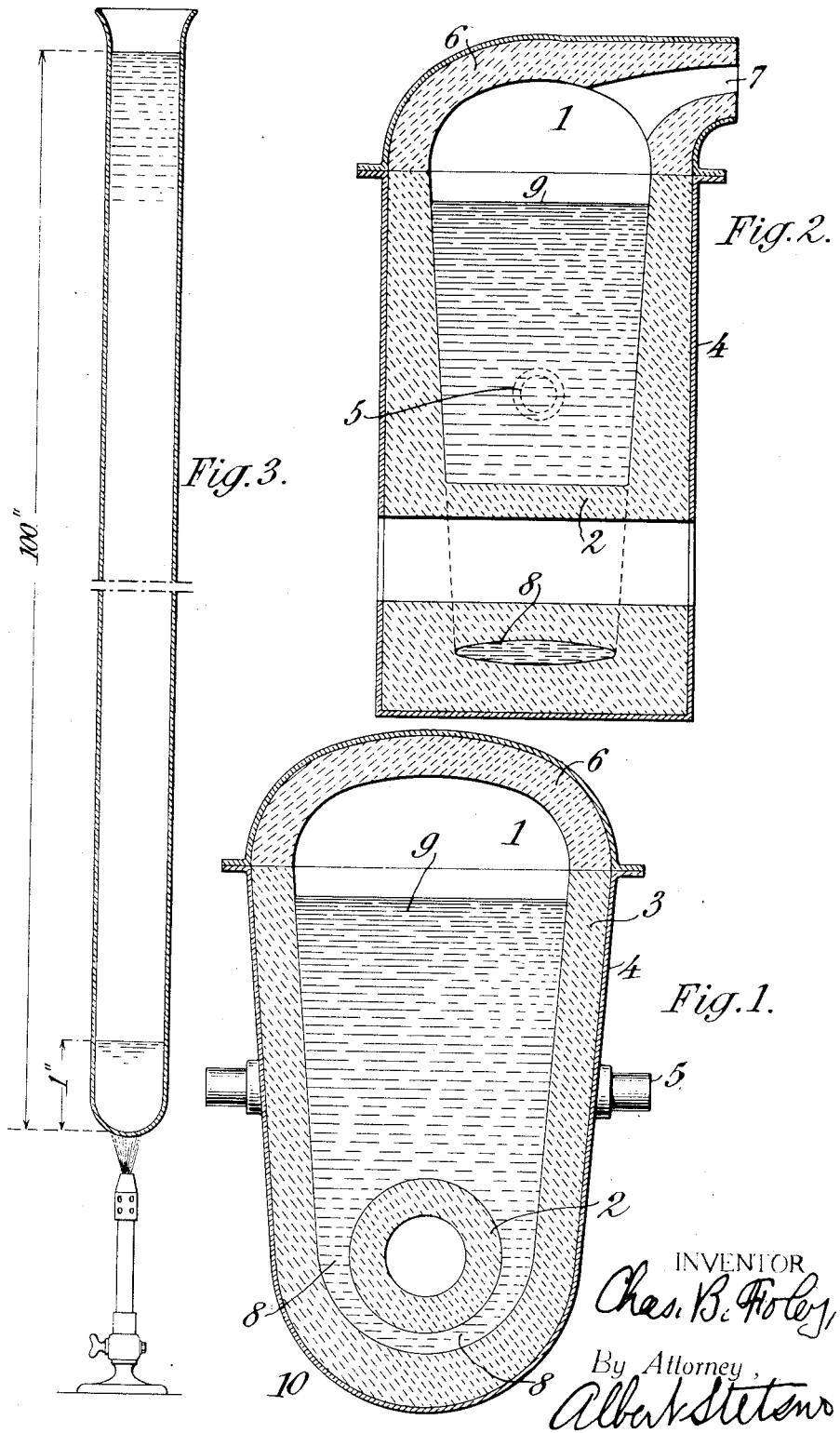

UNITED STATES PATENT OFFICE.

CHARLES BRUCE FOLEY, OF BROOKLYN, NEW YORK.

PROCESS OF TREATING METALS AND ALLOYS.

1,350,714.     Specification of Letters Patent.     Patented Aug. 24, 1920.

Application filed June 29, 1917, Serial No. 177,625. Renewed January 19, 1920. Serial No. 352,638.

*To all whom it may concern:*

Be it known that I, CHARLES BRUCE FOLEY, a citizen of the United States, and a resident of Brooklyn, in the county of Kings and State of New York, have invented a certain new and useful Process of Treating Metals and Alloys, of which the following is a specification.

My invention relates to electric induction furnaces of the crucible or similar type, especially to the kind described in my U. S. application Ser. No. 98,681 filed Dec. 28, 1916.

It relates particularly to the carrying out in such furnaces of processes for treating by induced currents masses of metal forming a molten secondary, the process being specially adapted for the treatment of the non-ferrous metals, alloys and compounds of low ohmic resistance, although remarkably efficient in treating ferrous metals and their alloys.

In electric induction furnaces hitherto in use, it has been generally customary to employ as the molten secondary a shallow, annular trough or ring, the depth of the molten metals scarcely exceeding a foot or fourteen inches. There are various disadvantages connected with such shallow molten secondaries, and it is the aim of this invention to correct these defects.

To carry out my invention I employ, instead of the said shallow secondary, a high hydrostatic head of metal, and I so proportion my hydrostatic head to the character of the metal under treatment and the type of work to be carried out in the furnace as to obtain maximum efficiency of operation, as will be hereinafter set forth.

In the drawings attached to and forming a part of this specification,

Figure 1 is a vertical section approximately through the center of furnace;

Fig. 2 a similar section at right angle to that of Fig. 1, and

Fig. 3, an illustrative figure for showing the principle of the process.

Referring to the drawings:—1 is an induction furnace of the crucible type, perforated near the bottom from side to side to allow the insertion of a refractory tube, or channel, 2, into which is inserted the current inducing means (not shown). The crucible is composed of the refractory body 3, which is preferably inclosed in a metal casing 4, the whole being mounted to swing on trunnions 5, and preferably surmounted by a cap piece 6, provided with a tap hole 7. By locating near the bottom of the crucible the refractory tube 2, there is formed on the inside at the bottom and along the sides of the furnace a constricted passage 8, in which is produced the greatest heat effect on the molten secondary 9. In the constricted portion of the molten secondary 9 there is also produced the greatest action of the electromagnetic forces tending to rupture the secondary, which tendency by the design of my furnace is counterbalanced and overcome by the high hydrostatic head of molten secondary 9.

The primary object of my invention is to use in an induction furnace, where the heat is applied near the bottom, a hydrostatic head of molten metal much in excess of that employed in the shallow ring type, and to so coördinate the said hydrostatic head with the qualities of the metal under treatment as to absolutely control the process, insuring the greatest heat addition in the shortest time, reducing the heat radiation losses to the lowest proportions and obtaining certain other great advantages.

It is well known that the temperature at which a liquid boils depends, among other things, on the pressure to which it is subjected. I take advantage of this fact by employing a high hydrostatic head, and thereby produce a relatively greater pressure in the material at the bottom part of the molten metal secondary, which increased pressure raises the boiling point of the liquid at this point. In other words, it creates a condition which will require a higher temperature to produce boiling of the liquid in the lower part than the temperature required at that point in order to maintain a proper working temperature in the upper portion to be tapped off. I take advantage of this fact by employing a high hydrostatic head in the molten secondary, and I do, in consequence thereof, raise the boiling point of the lowest part of my molten metal bath, which point is also the hottest, thereby enabling me to impart in a shorter space of time a larger amount of heat units to the charge without metal losses occurring, because boiling cannot take place at the desired working temperatures of the furnace, since a high head of metal overcomes it. As radiation is a function of the time during which the charge is under heat, the advantage of being able to impart a large amount of heat in unit time is apparent. The higher the hydrostatic head, the more rapidly the heating in the constricted zone may be carried out without the disturbing influence of "pinch effect."

In a furnace such as is shown in the drawings, it is apparent that, the heat being added to the melt at the bottom and the greatest heat being developed there and at the lower sides, the temperature of the melt at different heights will be different. The working requirement of the furnace is, of course, to maintain the temperature of the melt at the pour-off point such that the metal there is at the desired casting temperature. This is attained by coödinating the heat units in the hottest zone with the hydrostatic head of the metal in such a manner as to develop and maintain the desired casting temperature in the upper pour-off portion of the bath, without the metal in the hottest lower portion actually reaching the boiling point. Other advantages, however, follow from coördinating hydrostatic head with heat addition. For example, since the heat is added at the bottom, this portion is always several degrees hotter than the main body of the metal, and as we approach casting temperature boiling temperature in the lower part is reached before the upper portion has reached the desired average working temperature. This excess in the zone of greatest heat development, if the boiling point is not controlled causes volumes of metallic vapor to form. If the substances treated be alloys, with one or more ingredients having a boiling point considerably below the working temperature of the alloy as a whole, these metallic vapors will be developed in such a manner and in such quantity as to seriously interfere with the working of the melt or alloy under treatment. This formation of troublesome vapors is avoided in my process by maintaining the proper relation between the hydrostatic head and heat addition, in other words, by coördinating hydrostatic head and current density. The formation of metallic vapors is especially detrimental in the case of treating brasses containing large percentages of zinc. This can be prevented by coördinating hydrostatic head with the rate of heat addition and with the vaporizing point of the alloy. Increase the hydrostatic head, or cut down heat addition.

Under certain circumstances, where the desired temperature is near the boiling point of the melt, this formation of metallic vapors at the point receiving heat will so interfere with the heating of the metal that it cannot be brought to the desired temperature, unless the rate of heat addition is exceedingly small, in many cases, less than the loss by radiation, so that the desired temperature will never be reached. Moreover, certain substances when in the heated vapor form are subjected to very rapid oxidation on contact with the air and this rapid oxidation causes violent explosions. Such vapors liberated in the air are, in many cases, especially with brass, the cause of serious metallic losses. The saving of these vapors in brass making becomes a serious and important commercial problem. With the use of my process, in making yellow brass, zinc losses can be easily held down to 15-100ths of one per cent. of the metal melted. In the ordinary treatment of yellow brass in crucibles, the zinc losses due to volatilization often reach as high as five per cent. of the zinc in the mixture. The melting period in this case does not exceed an hour and thirty minutes and the actual time of greatest temperature and complete fusion does not exceed twenty minutes. By my process, using an apparatus in which the heat is applied at the bottom, and employing a hydrostatic head of approximately 50 inches, I have held yellow brass in a molten state for days with a zinc loss of less than an average of 63-1000ths of one per cent. per hour. This is in marked contrast with the pit fire method showing a loss of five per cent. in 20 minutes, and under a hydrostatic head of 12 inches in a crucible.

I am aware of the phenomenon of electromagnetic stricture, or "pinch effect," and know that it has been attempted to utilize this rupturing effect in an electric furnace. But it is very difficult to utilize this so-called "pinch effect" or rupture effect, because of oxidation of the metal at the point of rupture, even when such interruptions are of only momentary duration. Moreover, this phenomenon introduces current variations that are very disturbing and difficult to control. I avoid any pinch effect rupture by so coördinating my hydrostatic head with my heat addition that the effects of pinch rupture are entirely eliminated. By making my hydrostatic head high enough, I can add heat at any rate that my conductors and refractories will stand.

Having thus fully described and illustrated my invention, what I claim, is:—

1. The process of treating molten metals which comprises reducing the metals to a molten state, passing an induced electric current through the mass, and maintaining at each locality of heat addition by said current a hydrostatic head which exceeds the vapor tension of the mass at the temperature there being generated.

2. The process of treating alloys formed of certain components having a lower boiling point than the alloy as a whole, which comprises applying the heat near the bottom of the molten metal and coördinating the hydrostatic head with the rate of heat addition, above the normal boiling point.

3. The process of treating metals liable to vaporize under high temperatures, which comprises forming in an induction furnace of the crucible type a zone of greatest heat addition near the bottom of the furnace, and so coördinating the hydrostatic head of metal with the rate of heat addition that the formation of vapor volumes at the bottom is practically prevented.

4. The process of treating brasses composed of copper and zinc, the zinc having comparatively low vaporizing temperature, which comprises subjecting such brasses to the action of an induced current applied near the bottom of the molten mass, and so coördinating the hydrostatic head with the rate of heat addition that the desired temperature is maintained in the molten metal and the tendency to vaporization practically eliminated.

5. The process of heating metals, which comprises inclosing the molten metal in a furnace of the crucible type, providing such furnace with current inducing means located near the bottom of the molten mass and entirely encircled thereby, and so coördinating the hydrostatic head of the metal and heat produced by the current inducing means that vaporization is practically eliminated, and the metal held at the desired temperature.

6. The process of treating metals and their compounds in the molten state, which comprises forming in an induction furnace a zone of greatest heat addition near the bottom of the furnace, so locating the current inducing means as to form a constricted area between the said inducing means and the bottom and sides of the furnace, and so coördinating the hydrostatic head and the heat addition that rupture of the metal from pinch effect is entirely eliminated.

7. The process of treating alloys formed of certain components having a lower boiling point than the alloy as a whole, which comprises applying the heat near the bottom of the molten metal and coördinating the hydrostatic head with the rate of heat addition so that the boiling point of the said components is at all times above the temperature maintained by the rate of heat addition.

8. The process of heating metals, which comprises forming by suitable refractory walls a pool of molten metal and a loop of molten metal joined therewith, inducing electric currents in said loop and pool to heat the metal, and so coördinating the hydrostatic head of metal with the rate of heat addition that losses by vaporization of the metal are practically eliminated.

9. The process of heating metals, which comprises forming by suitable refractory walls a pool of molten metal and a loop of molten metal joined therewith, inducing electric currents in said loop and pool to heat the metal, and so coördinating the hydrostatic head of metal with the rate of heat addition or current density that rupture of said loop by the so-called "pinch effect" is prevented.

10. The process of heating metals, which comprises inclosing the molten metal in a furnace of the crucible type, subjecting the metal to a maximum rate of heat addition near the bottom of the furnace and maintaining a hydrostatic head of metal at the points of heat addition sufficiently high to prevent vaporization of the metal.

11. The process of heating metals, which comprises inclosing the molten metal in a furnace of the crucible type, having provision for forming the metal in the lower part of the crucible into an arc or loop, heating the metal by inducing electric currents in said arc and maintaining at each point in said arc a hydrostatic head of metal sufficiently high to prevent rupture of the arc by the current flowing therein.

12. The process of heating metals, which comprises forming by suitable refractory walls a pool of molten metal, applying the heat near the bottom of said pool, and maintaining the depth of said pool sufficiently great to prevent substantial losses by vaporization of the metal.

13. The process of heating metals, which comprises forming by suitable refractory walls a pool of molten metal having a constricted loop of molten metal depending therefrom, inducing electric currents in said loop and pool to heat the metal, and maintaining a sufficient depth of metal above the loop to prevent the escape of vapor volumes at the surface of the pool.

Signed at New York, in the county of New York and State of New York, this 14th day of May, A. D. 1917.

CHARLES BRUCE FOLEY.

Witnesses:
A. STETSON,
L. E. DANIELS.